(12) United States Patent
Mustiere et al.

(10) Patent No.: US 10,679,617 B2
(45) Date of Patent: Jun. 9, 2020

(54) VOICE ENHANCEMENT IN AUDIO SIGNALS THROUGH MODIFIED GENERALIZED EIGENVALUE BEAMFORMER

(71) Applicant: SYNAPTICS INCORPORATED, San Jose, CA (US)

(72) Inventors: Frederic Philippe Denis Mustiere, Irvine, CA (US); Francesco Nesta, Aliso Viejo, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/833,977

(22) Filed: Dec. 6, 2017

(65) Prior Publication Data
US 2019/0172450 A1    Jun. 6, 2019

(51) Int. Cl.
*G10L 21/00* (2013.01)
*G10L 15/20* (2006.01)
(Continued)

(52) U.S. Cl.
CPC .............. *G10L 15/20* (2013.01); *G10L 15/22* (2013.01); *G10L 21/0232* (2013.01); *G10L 21/038* (2013.01); *G10L 25/21* (2013.01); *G10L 25/84* (2013.01); *H04R 3/005* (2013.01); *H04R 27/00* (2013.01); *G10L 25/78* (2013.01); *G10L 2015/223* (2013.01); *G10L 2021/02166* (2013.01); *H04R 1/406* (2013.01);
(Continued)

(58) Field of Classification Search
CPC ...................... G10L 2021/02166; G10L 15/22
See application file for complete search history.

(56) References Cited

U.S. PATENT DOCUMENTS 8,392,184 B2    3/2013    Buck et al.
8,660,274 B2    2/2014    Wolff et al.
(Continued)

OTHER PUBLICATIONS

B. David and R. Badeau, "Fast Sequential LS Estimation for Sinusoidal Modeling and Decomposition of Audio Signals," 2007 IEEE Workshop on Applications of Signal Processing to Audio and Acoustics, New Paltz, NY, USA, 2007, pp. 211-214. (Year: 2007).*
(Continued)

*Primary Examiner* — Douglas Godbold
(74) *Attorney, Agent, or Firm* — Haynes and Boone, LLP

(57) ABSTRACT

A real-time audio signal processing system includes an audio signal processor configured to process audio signals using a modified generalized eigenvalue (GEV) beamforming technique to generate an enhanced target audio output signal. The digital signal processor includes a sub-band decomposition circuitry configured to decompose the audio signal into sub-band frames in the frequency domain and a target activity detector configured to detect whether a target audio is present in the sub-band frames. Based on information related to the sub-band frames and the determination of whether the target audio is present in the sub-band frames, the digital signal processor is configured to use the modified GEV technique to estimate the relative transfer function (RTF) of the target audio source, and generate a filter based on the estimated RTF. The filter may then be applied to the audio signals to generate the enhanced audio output signal.

23 Claims, 6 Drawing Sheets

(51) Int. Cl.

| | |
|---|---|
| *G10L 15/22* | (2006.01) |
| *G10L 21/038* | (2013.01) |
| *G10L 25/84* | (2013.01) |
| *H04R 3/00* | (2006.01) |
| *G10L 21/0232* | (2013.01) |
| *G10L 25/21* | (2013.01) |
| *H04R 27/00* | (2006.01) |
| *H04R 1/40* | (2006.01) |
| *G10L 25/78* | (2013.01) |
| *H04R 5/04* | (2006.01) |
| *G10L 21/0216* | (2013.01) |
| *H04R 5/02* | (2006.01) |

(52) U.S. Cl.
CPC .................. *H04R 5/02* (2013.01); *H04R 5/04* (2013.01); *H04R 2227/001* (2013.01); *H04R 2227/003* (2013.01); *H04R 2227/005* (2013.01); *H04R 2227/009* (2013.01)

(56) References Cited

U.S. PATENT DOCUMENTS

| | | | |
|---|---|---|---|
| 9,054,764 | B2 | 6/2015 | Tashev et al. |
| 9,432,769 | B1 | 8/2016 | Sundaram et al. |
| 10,090,000 | B1* | 10/2018 | Tzirkel-Hancock ......................... G10L 21/0208 |
| 10,096,328 | B1* | 10/2018 | Markovich-Golan ...................... G10L 21/0216 |
| 2010/0296668 | A1 | 11/2010 | Lee et al. |
| 2013/0301840 | A1 | 11/2013 | Yemdji et al. |
| 2014/0056435 | A1* | 2/2014 | Kjems ................... H04M 9/082 381/66 |
| 2015/0256956 | A1* | 9/2015 | Jensen ................... H04R 25/30 381/56 |
| 2015/0286459 | A1 | 10/2015 | Habets et al. |
| 2018/0039478 | A1* | 2/2018 | Sung ..................... G06F 3/0481 |
| 2018/0240471 | A1* | 8/2018 | Markovich Golan ...................... G10L 21/0232 |
| 2018/0350381 | A1* | 12/2018 | Bryan ................. G10L 21/0208 |

OTHER PUBLICATIONS

Hori et al., "Multi-microphone speech recognition integrating beamforming, robust feature extraction, and advanced DNN/RNN backend," Computer Speech & Language, Nov. 2017, pp. 401-418, vol. 46, Issue C, Elsevier.

Lorenz et al., "Robust Minimum Variance Beamforming," IEEE Transactions on Signal Processing, May 2005, pp. 1684-1696, vol. 53, Issue 5, IEEE, New Jersey, U.S.A.

Scharf et al., "Eigenvalue Beamforming using a Multi-rank MVDR Beamformer," 2006, 5 Pages.

Tanaka et al., "Acoustic Beamforming with Maximum SNR Criterion and Efficient Generalized Eigenvector Tracking," Advances in Multimedia Information Processing—PCM 2014, Dec. 2014, pp. 373-374, vol. 8879, Springer.

Vorobyov, Sergiy, "Principles of minimum variance robust adaptive beamforming design," Signal Processing, 2013, pp. 3264-3277, vol. 93, Issue 12, Elsevier.

Zhou et al., "Optimal Transmitter Eigen-Beamforming and Space-Time Block Coding Based on Channel Mean Feedback," IEEE Transactions on Signal Processing, Oct. 2002, pp. 2599-2613, vol. 50, No. 10, IEEE, New Jersey, U.S.A.

Xiaofei Li et al., "Estimation of Relative Transfer Function in the Presence of Stationary Noise Based on Segmented Power Spectral Density Matrix Subtractions", 2015 IEEE International Conference on Acoustics, Speech and Signal Processing (ICASSP), Feb. 21, 2015, 8 pages.

Maja, Taseska et al. "Relative Transfer Function Estimation Exploiting Instantaneous Signals and the Signal Subspace", 23$^{rd}$ European Signal Processing Conference (EUSIPCO), Aug. 2015 pp. 404-408.

Written Opinion and International Search Report for International App. No. PCT/US2018/064133, 11 pages.

* cited by examiner

VOICE ENHANCEMENT IN AUDIO SIGNALS THROUGH MODIFIED GENERALIZED EIGENVALUE BEAMFORMER

TECHNICAL FIELD

The present disclosure, in accordance with one or more embodiments, relates generally to audio signal processing, and more particularly for example, to systems and methods to enhance a desired audio signal in a noisy environment.

BACKGROUND

Smart speakers and other voice-controlled devices and appliances have gained popularity in recent years. Smart speakers often include an array of microphones for receiving audio inputs (e.g., verbal commands of a user) from an environment. When target audio (e.g., the verbal command) is detected in the audio inputs, the smart speaker may translate the detected target audio into one or more commands and perform different tasks based on the commands. One challenge of these smart speakers is to efficiently and effectively isolate the target audio (e.g., the verbal command) from noise in the operating environment. The challenges are exacerbated in noisy environments where the target audio may come from any direction relative to the microphones. There is therefore a need for improved systems and methods for processing audio signals that are received in a noisy environment.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Figure 1:
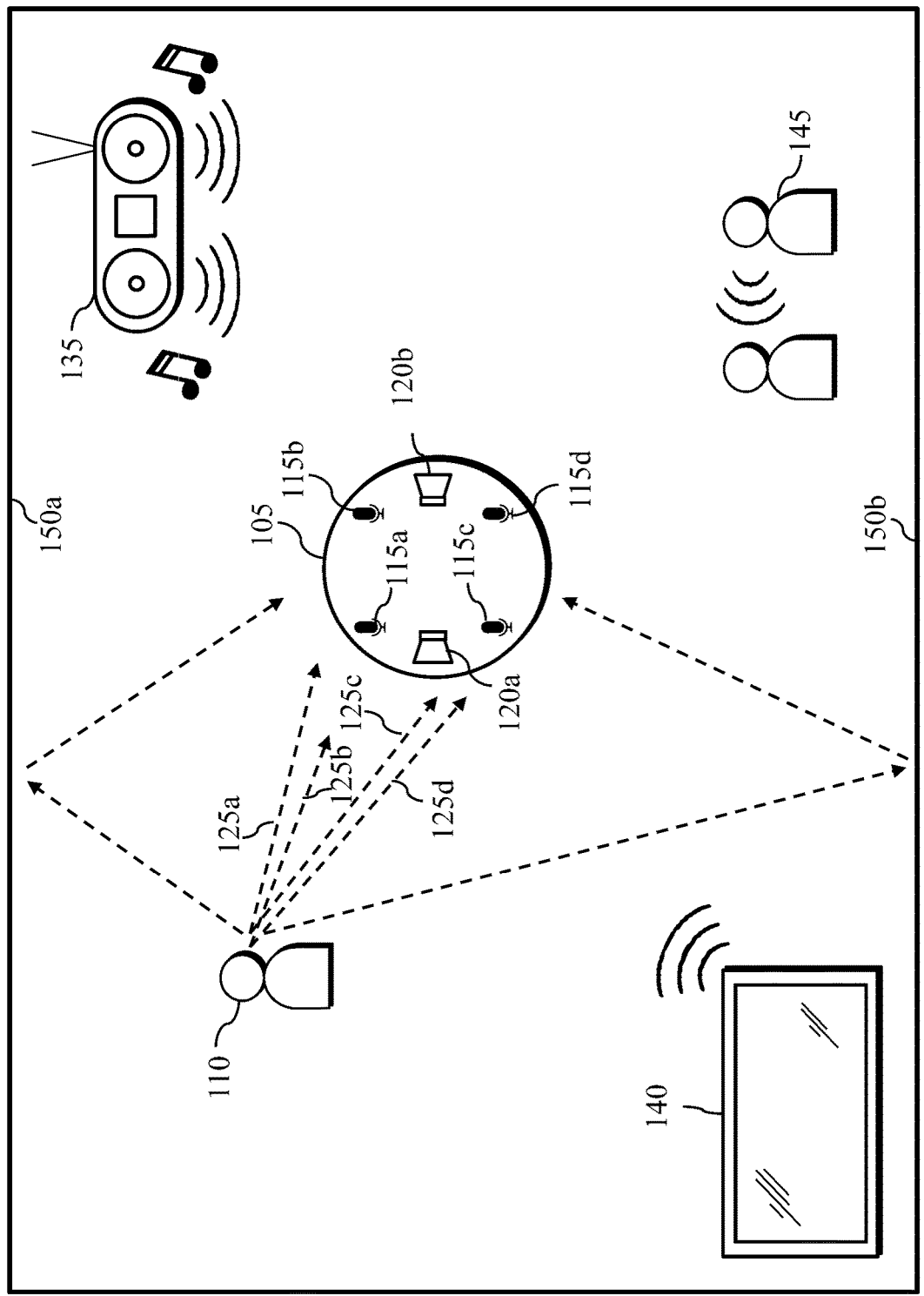
FIG. 1 illustrates an exemplary operating environment for an audio processing device in accordance with one or more embodiments of the disclosure.

Systems and methods for detecting and enhancing target audio in a noisy environment are disclosed herein. In various embodiments, a microphone array having a plurality of microphones senses target audio and noise in an operating environment and generates an audio signal for each microphone. Improved beamforming techniques incorporating generalized eigenvector tracking are disclosed herein to enhance the target audio in the received audio signals.

Traditional beamforming techniques operate to focus on audio received from a direction of a target audio source. Many beamforming solutions require information about the geometry of the microphone array and/or the location of the target source. Further, some beamforming solutions are processing intensive and can grow exponentially in complexity as the number of microphones increases. As such, traditional beamforming solutions may not be suitable for implementations having diverse geometries and applications constrained by requirements for real-time audio processing in low power devices. Various embodiments disclosed herein address these and other constraints in traditional beamforming systems.

In one or more embodiments of the present disclosure, a multi-channel audio input signal is received through an array of audio sensors (e.g., microphones). Each audio channel is analyzed to determine whether target audio is present, for example, whether a target person is actively speaking. The system tracks target and noise signals to determine the acoustic direction of maximum propagation for the target audio source relative to the microphone array. This direction is referred to as Relative Transfer Function (RTF). In various embodiments, an improved generalized eigenvector process is used to determine the RTF of the target audio in real time. The determined RTF may then be used by a spatial filtering process, such as a minimum variance distortionless response (MVDR) beamformer, to enhance the target audio. After the audio input signals are processed, an enhanced audio output signal may be used, for example, as audio output transmitted to one or more speakers, as voice communications in a telephone or voice over IP (VoIP) call, for speech recognition or voice command processing, or other voice application.

According to various embodiments of the disclosure, a modified generalized eigenvector (GEV) system and method is used to efficiently determine the RTF of the audio source in real-time, without the knowledge of the geometry of the array of microphones or the audio environment. The modified GEV solutions discloses herein provide many advantages. For example, the modified GEV solutions may provide computationally efficient, scalable, online tracking of a principal eigenvector that may be used in a variety of systems, including systems having large microphone arrays. The solutions disclosed herein may be distortionless in the direction of the target audio source, and robustness is increased by enforcing source and noise models that are valid within the disclosed systems and methods. The systems and methods disclosed herein may be used, for example, to improve automated speech recognition (ASR) systems and voice communications systems where target speech is received in a noisy environment.

FIG. 1 illustrates an exemplary operating environment 100 in which an audio processing system may operate according to various embodiments of the disclosure. The operating environment 100 includes an audio processing device 105, a target audio source 110, and one or more noise sources 135-145. In the example illustrated in FIG. 1, the operating environment is illustrated as a room 100, but it is contemplated that the operating environment may include other areas, such as an inside of a vehicle, an office conference room, rooms of a home, an outdoor stadium or an airport. In accordance with various embodiments of the disclosure, the audio processing device 105 may include two or more audio sensing components (e.g., microphones) 115a-115d and, optionally, one or more audio output components (e.g., speakers) 120a-120b.

The audio processing device 105 may be configured to sense sound via the audio receiving components 115a-115d and generate a multi-channel audio input signal, comprising two or more audio input signals. The audio processing device 105 may process the audio input signals using audio processing techniques disclosed herein to enhance the audio signal received from the target audio source 110. For example, the processed audio signals may be transmitted to other components within the audio processing device 105, such as a speech recognition engine or voice command processor, or to an external device. Thus, the audio processing device 105 may be a standalone device that processes audio signals, or a device that turns the processed audio signals into other signals (e.g., a command, an instruction, etc.) for interacting with or controlling an external device. In other embodiments, the audio processing device 105 may be a communications device, such as mobile phone or voice-over-IP (VoIP) enabled device, and the processed audio signals may be transmitted over a network to another device for output to a remote user. The communications device may also receive processed audio signals from a remote device and output the processed audio signals via the audio output components 120a-120b.

The target audio source 110 may be any source that produces audio detectable by the audio processing device 105. The target audio may be defined based on criteria specified by user or system requirements. For example, the target audio may be defined as human speech, a sound made by a particular animal or a machine. In the illustrated example, the target audio is defined as human speech, and the target audio source 110 is a person. In addition to target audio source 110, the operating environment 100 may include one or more noise sources 135-145. In various embodiments, sound that is not target audio is processed as noise. In the illustrated example, the noise sources 135-145 may include a loud speaker 135 playing music, a television 140 playing a television show, movie or sporting event, and background conversations between non-target speakers 145. It will be appreciated that other noise sources may be present in various operating environments.

It is noted that the target audio and noise may reach the microphones 115a-115d of the audio processing device 105 from different directions. For example, the noise sources 135-145 may produce noise at different locations within the room 100, and the target audio source (person) 110 may speak while moving between locations within the room 100. Furthermore, the target audio and/or the noise may reflect off fixtures (e.g., walls) within the room 100. For example, consider the paths that the target audio may traverse from the person 110 to reach each of the microphones 115a-115d. As indicated by arrows 125a-125d, the target audio may directly travel from the person 110 to the microphones 115a-115d, respectively. Additionally, the target audio may reflect off the walls 150a and 150b, and reach the microphones 115a-115d indirectly from the person 110, as indicated by arrows 130a-130b. According to various embodiments of the disclosure, the audio processing device 105 may use the audio processing techniques disclosed herein to estimate the RTF of the target audio source 110 based on the audio input signals received by the microphones 115a-115d, and process the audio input signals to enhance the target audio and suppress noise based on the estimated RTF.

Figure 2:
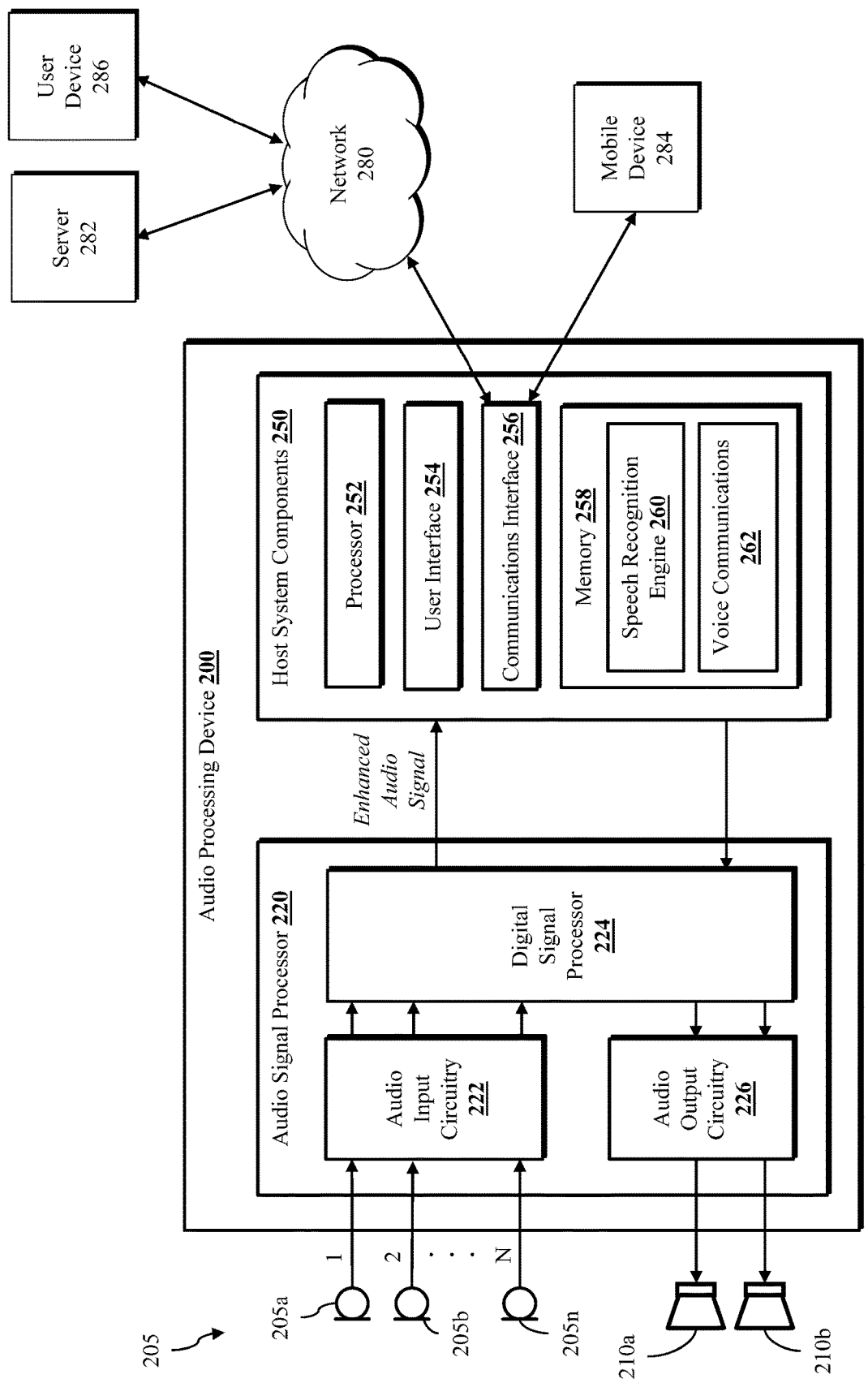
FIG. 2 is a block diagram of an exemplary audio processing device in accordance with one or more embodiments of the disclosure.

FIG. 2 illustrates an exemplary audio processing device 200 according to various embodiments of the disclosure. In some embodiments, the audio device 200 may be implemented as the audio processing device 105 of FIG. 1. The audio device 200 includes an audio sensor array 205, an audio signal processor 220 and host system components 250.

The audio sensor array 205 comprises two or more sensors, each of which may be implemented as a transducer that converts audio inputs in the form of sound waves into an audio signal. In the illustrated environment, the audio sensor array 205 comprises a plurality of microphones 205a-205n, each generating an audio input signal which is provided to the audio input circuitry 222 of the audio signal processor 220. In one embodiment, the sensor array 205 generates a multichannel audio signal, with each channel corresponding to an audio input signal from one of the microphones 205a-n.

The audio signal processor 220 includes the audio input circuitry 222, a digital signal processor 224 and optional audio output circuitry 226. In various embodiments the audio signal processor 220 may be implemented as an integrated circuit comprising analog circuitry, digital circuitry and the digital signal processor 224, which is operable to execute program instructions stored in firmware. The audio input circuitry 222, for example, may include an interface to the audio sensor array 205, anti-aliasing filters, analog-to-digital converter circuitry, echo cancellation circuitry, and other audio processing circuitry and components as disclosed herein. The digital signal processor 224 is operable to process a multichannel digital audio signal to generate an enhanced audio signal, which is output to one or more host system components 250. In various embodiments, the digital signal processor 224 may be operable to perform echo cancellation, noise cancellation, target signal enhancement, post-filtering, and other audio signal processing functions.

The optional audio output circuitry 226 processes audio signals received from the digital signal processor 224 for output to at least one speaker, such as speakers 210a and 210b. In various embodiments, the audio output circuitry 226 may include a digital-to-analog converter that converts one or more digital audio signals to analog and one or more amplifiers for driving the speakers 210a-210b.

The audio processing device 200 may be implemented as any device operable to receive and enhance target audio data, such as, for example, a mobile phone, smart speaker, tablet, laptop computer, desktop computer, voice controlled appliance, or automobile. The host system components 250 may comprise various hardware and software components for operating the audio processing device 200. In the illustrated embodiment, the system components 250 include a processor 252, user interface components 254, a communications interface 256 for communicating with external devices and networks, such as network 280 (e.g., the Internet, the cloud, a local area network, or a cellular network) and mobile device 284, and a memory 258.

The processor 252 and digital signal processor 224 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The host system components 250 are configured to interface and communicate with the audio signal processor 220 and the other system components 250, such as through a bus or other electronic communications interface.

It will be appreciated that although the audio signal processor 220 and the host system components 250 are shown as incorporating a combination of hardware components, circuitry and software, in some embodiments, at least some or all of the functionalities that the hardware components and circuitries are operable to perform may be implemented as software modules being executed by the processing component 252 and/or digital signal processor 224 in response to software instructions and/or configuration data, stored in the memory 258 or firmware of the digital signal processor 222.

The memory 258 may be implemented as one or more memory devices operable to store data and information, including audio data and program instructions. Memory 258 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 252 may be operable to execute software instructions stored in the memory 258. In various embodiments, a speech recognition engine 260 is operable to process the enhanced audio signal received from the audio signal processor 220, including identifying and executing voice commands. Voice communications components 262 may be operable to facilitate voice communications with one or more external devices such as a mobile device 284 or user device 286, such as through a voice call over a mobile or cellular telephone network or a VoIP call over an IP network. In various embodiments, voice communications include transmission of the enhanced audio signal to an external communications device.

The user interface components 254 may include a display, a touchpad display, a keypad, one or more buttons and/or other input/output components operable to enable a user to directly interact with the audio device 200.

The communications interface 256 facilitates communication between the audio device 200 and external devices. For example, the communications interface 256 may enable Wi-Fi (e.g., 802.11) or Bluetooth connections between the audio device 200 and one or more local devices, such mobile device 284, or a wireless router providing network access to a remote server 282, such as through the network 280. In various embodiments, the communications interface 256 may include other wired and wireless communications components facilitating direct or indirect communications between the audio device 200 and one or more other devices.

Figure 3:
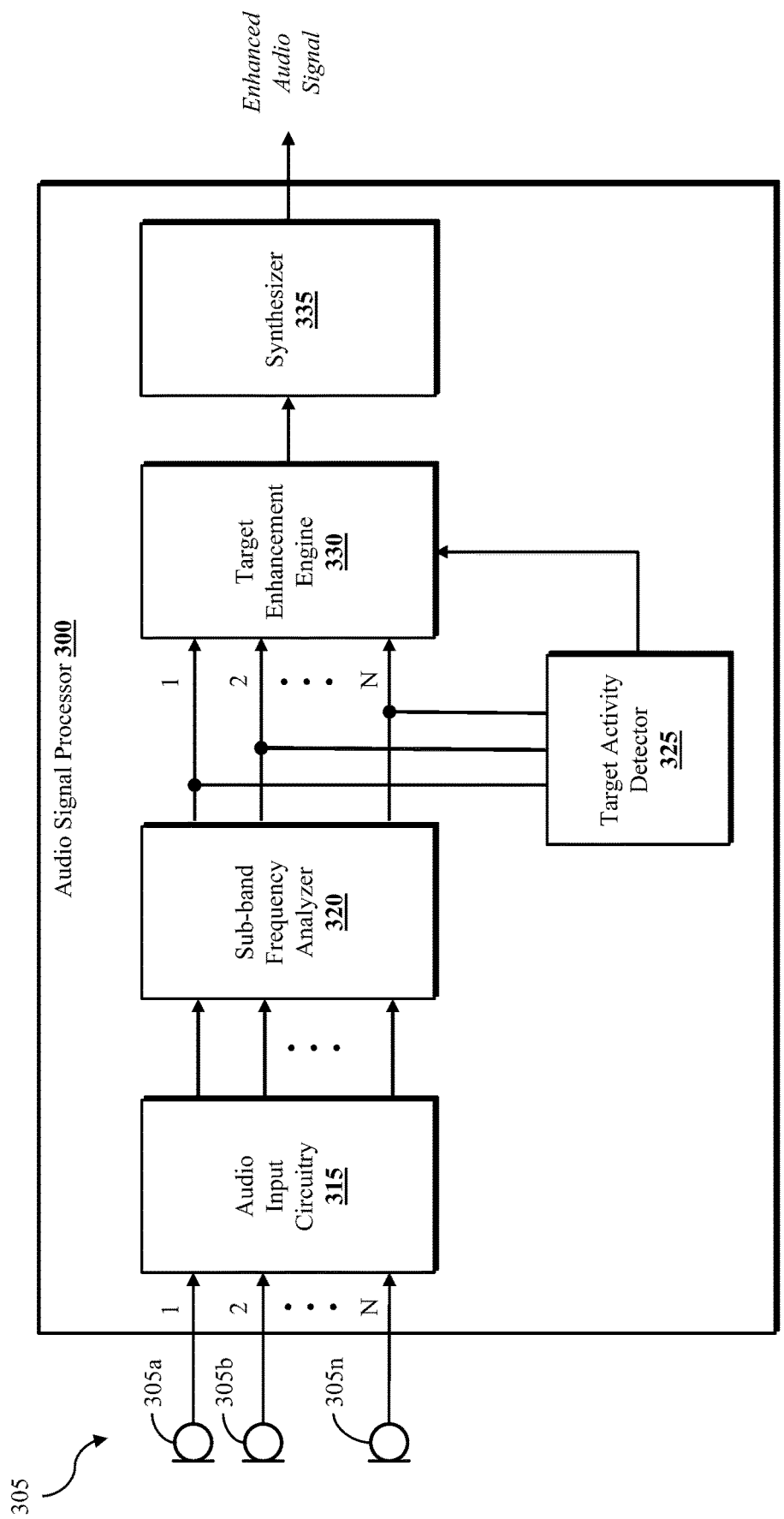
FIG. 3 is a block diagram of exemplary audio signal processor in accordance with one or more embodiments of the disclosure.

FIG. 3 illustrates an exemplary audio signal processor 300 according to various embodiments of the disclosure. In some embodiments, the audio input processor 300 is embodied as one or more integrated circuits including analog and digital circuitry and firmware logic implemented by a digital signal processor, such as audio signal processor 224 of FIG. 2. As illustrated, the audio signal processor 300 includes audio input circuitry 315, a sub-band frequency analyzer 320, a target activity detector 325, a target enhancement engine 330, and a synthesizer 335.

The audio signal processor 300 receives a multi-channel audio input from a plurality of audio sensors, such as a sensor array 305 comprising at least two audio sensors 305a-n. The audio sensors 305a-305n may include microphones that are integrated with an audio processing device, such as the audio processing device 200 of FIG. 2, or external components connected thereto. The arrangement of the audio sensors 305a-305n may be known or unknown to the audio input processor 300 according to various embodiments of the disclosure.

The audio signals may be processed initially by the audio input circuitry 315, which may include anti-aliasing filters, analog to digital converters, and/or other audio input circuitry. In various embodiments, the audio input circuitry 315 outputs a digital, multichannel, time-domain audio signal having N channels, where N is the number of sensor (e.g., microphone) inputs. The multichannel audio signal is input to the sub-band frequency analyzer 320, which partitions the multichannel audio signal into successive frames and decomposes each frame of each channel into a plurality of frequency sub-bands. In various embodiments, the sub-band frequency analyzer 320 includes a Fourier transform process and outputs a plurality of frequency bins. The decomposed audio signals are then provided to the target activity detector 325 and the target enhancement engine 330.

The target activity detector 325 is operable to analyze the frames of one or more of the audio channels and generate a signal indicating whether target audio is present in the current frame. As discussed above, target audio may be any audio to be identified by the audio system. When the target audio is human speech, the target activity detector 325 may be implemented as a voice activity detector. In various embodiments, a voice activity detector operable to receive a frame of audio data and make a determination regarding the presence or absence of the target audio may be used. In some embodiments, the target activity detector 325 may apply target audio classification rules to the sub-band frames to compute a value. The value is then compared to a threshold value for generating a target activity signal. In various embodiments, the signal generated by the target activity detector 325 is a binary signal, such as an output of '1' to indicate a presence of target speech in the sub-band audio frame and the binary output of '0' to indicate an absence of target speech in the sub-band audio frame. The generated binary output is provided to the target enhancement engine 330 for further processing of the multichannel audio signal. In other embodiments, the target activity signal may comprise a probability of target presence, an indication that a determination of target presence cannot be made, or other target presence information in accordance with system requirements.

The target enhancement engine 330 receives the sub-band frames from the sub-band frequency analyzer 320 and the target activity signal from the target activity detector 325. In accordance with various embodiments of the disclosure, the target enhancement engine 330 uses a modified generalized eigenvalue beamformer to process the sub-band frames based on the received activity signal, as will be described in more detail below. In some embodiments, processing the sub-band frames comprises estimating the RTF of the target audio source (e.g., the target audio source 110) relative to the sensor array 305. Based on the estimated RTF of the target audio source, the target enhancement engine 330 may enhance the portion of the audio signal determined to be from the direction of the target audio source and suppress the other portions of the audio signal which are determined to be noise.

After enhancing the target audio signal, the target enhancement engine 330 may pass the processed audio signal to the synthesizer 335. In various embodiments, the synthesizer 335 reconstructs one or more of the multichannel audio signals on a frame-by-frame basis by combing the sub-bands to form an enhanced time-domain audio signal.

The enhanced audio signal may then be transformed back to the time domain and sent to a system component or external device for further processing.

Figure 4A:
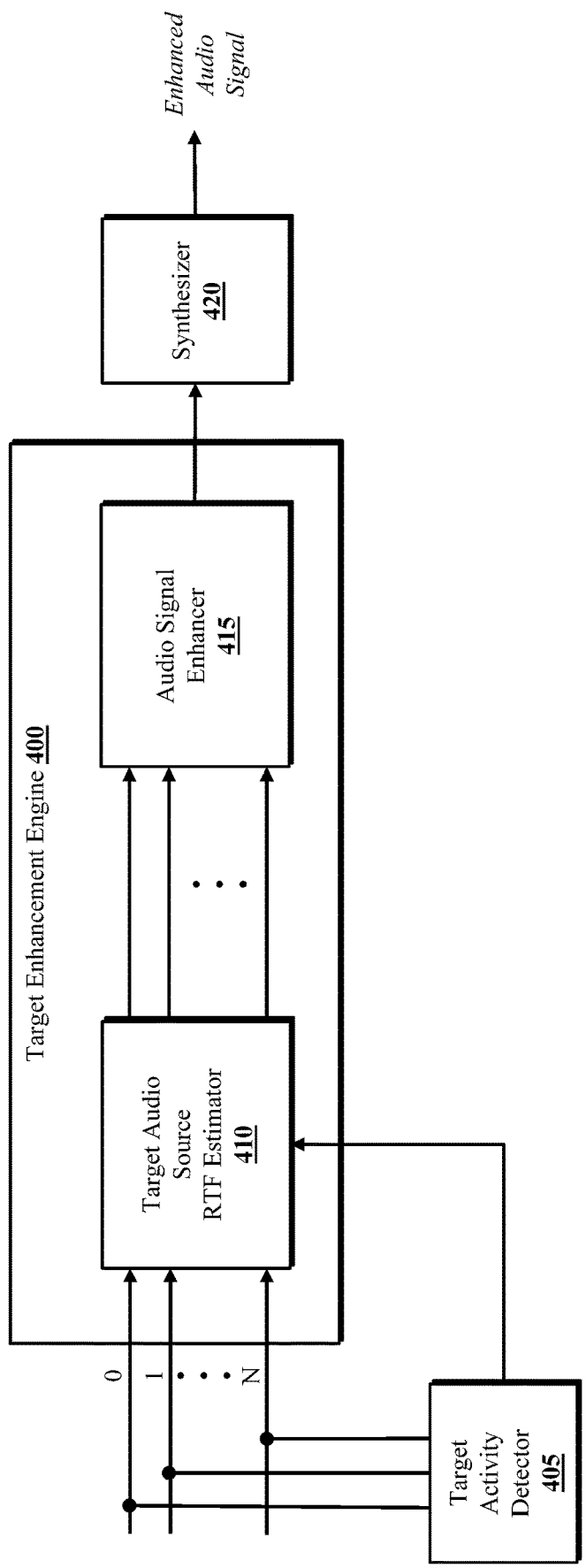
FIG. 4A is a block diagram of exemplary target enhancement engine in accordance with an embodiment of the disclosure.

FIG. 4 illustrates an exemplary target enhancement engine 400 for processing the sub-band frames according to various embodiments of the disclosure. The target enhancement engine 400 may be implemented as a combination of digital circuitry and logic performed by a digital signal processor. In many conventional systems, enhancement of a target signal using beamforming may require knowledge or estimation of the RTFs from the target audio source to the microphone array, which can be non-trivial if the array geometry is unknown a priori. In addition, as the number of microphones increase, many multichannel speech extraction algorithms grow exponentially in complexity, making such algorithms unsuitable for many real-time, lower power devices.

According to various embodiments of the disclosure, the target enhancement engine 400 comprises a target audio RTF estimation 410 and an audio signal enhancer 415. The target audio source RTF estimation 410 receives the sub-band frames and a target activity signal generated by the target activity detector 415 to determine an estimate of the RTF of the target source. In various embodiments, the target audio source RTF estimator includes a modified GEV process to generate a principal eigenvector. The audio signal enhancer 415 receives the output from the target source RTF estimator 410 and estimates the target audio signal. In various embodiments, the audio signal enhancer 415 uses the principal eigenvector to steer a beamforming process, such as by using a distortionless MVDR beamformer. The approaches disclosed herein resolve many of the drawbacks of techniques by providing computationally efficient operations and enforcing a distortionless constraint. In some embodiments, a noise output signal can be created for use in post-filtering. An exemplary GEV process is described below in accordance with various embodiments.

Figure 4B:
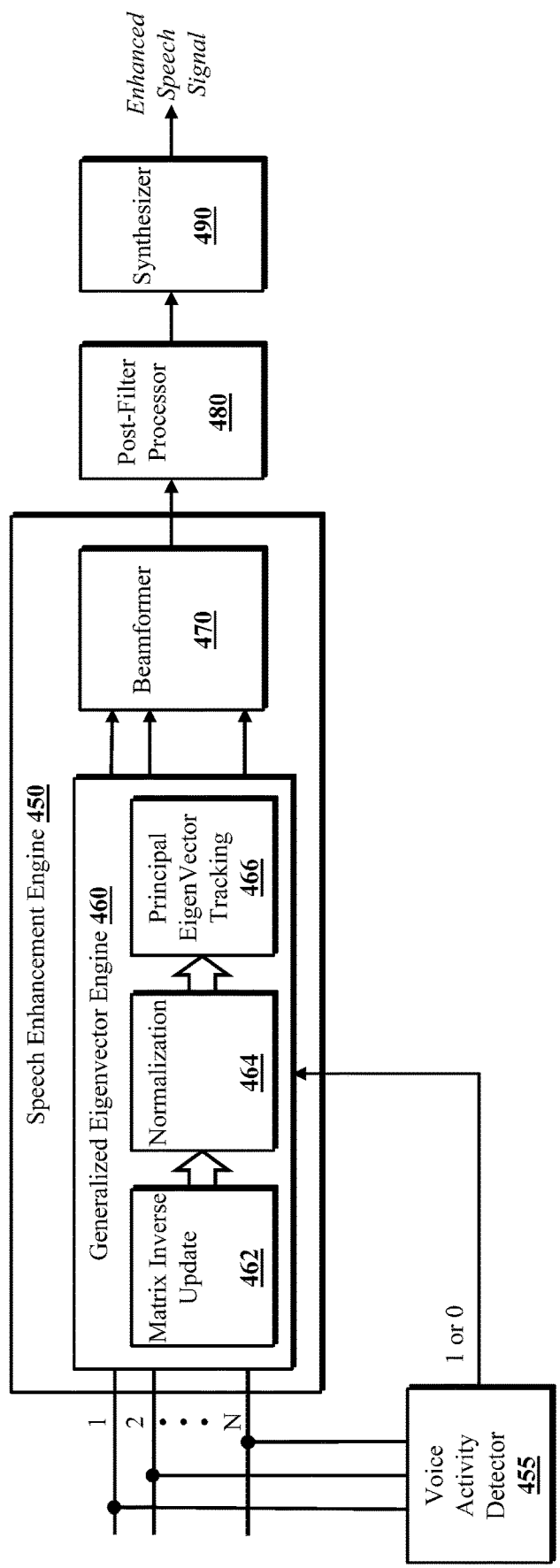
FIG. 4B is a block diagram of an exemplary speech enhancement engine in accordance with an embodiment of the disclosure.

Referring to FIG. 4B an exemplary speech enhancement engine 450 is illustrated. The speech enhancement engine 450 includes a generalized eigenvector (GEV) engine 460 and a beamformer 470. The GEV engine 460 receives a voice activity signal from a voice activity detector 455 and the decomposed sub-band audio signal. The GEV engine 460 includes inverse matrix update logic 462, normalization logic 464 and principle eigenvector tracking logic 466, which may be implemented in accordance with the process described herein. The principal eigenvector and signal information is provided to a beamformer 470, which may be implemented as an MVDR beamformer to produce separate target audio and, optionally, noise signals. In the illustrated embodiment, a post-filter processor 480 may be used to further remove noise elements from the target audio signal output from the beamformer 470.

Notation and Assumptions

In the illustrated environment, the target enhancement engine 400 measures the signals received from N microphones channels. Each microphone channel is transformed to k sub-bands and processing is performed on each frequency bin. An M×1 vector $x_k$ may be obtained at each frame indexed by k.

The signal model can be expressed as $x_k = h_k S_k + n_k$, where $S_k$ is the spectral component of the target audio, $h_k$ is the RTF vector (constrained with $h_k[1]=1$), and $n_k$ is the noise component.

The following notations may also be used:

$$P_x = E(x_k x_k^H)$$

$$P_n = E(n_k n_k^H)$$

$$P_S = E(|S_k|^2)$$

Normalization and Distortionless Constraint

In various embodiments, the target audio RTF estimator 410 is operable to enforce a distortionless constraint, thereby allowing the system to create a noise output signal that can be used for postfiltering.

With $f_{GEV}$ denoting beamformer coefficients for a GEV beamformer, and h representing a steering vector, the following equations show that $f_{GEV}$ and h are related via the noise covariance matrix $P_n$. It is recognized that $f_{GEV}$ is an eigenvector of $P_n^{-1} P_x$, and thus the following equations can be inferred:

$$P_n^{-1} P_x f_{GEV} \propto f_{GEV}$$

$$P_n^{-1}(P_S h h^H + P_n) \propto f_{GEV}$$

$$[P_n^{-1} h h^H] f_{GEV} \propto f_{GEV}$$

Since the matrix $P_n^{-1} h h^H$ has rank one, its eigenvector that corresponds to a non-zero eigenvalue is a scaled version of $f_{GEV}$. Further, using linear algebra theory on the eigenvectors of rank-one matrices, it can be inferred that $P_n^{-1} h$ is such an eigenvector. In other words, based on the equations above, it is recognized that $f_{GEV}$ and the RTF vector h are related, and their relationship can be expressed as $f_{GEV} \propto P_n^{-1} h$.

In view of the foregoing, an un-normalized estimate for the steering vector from the array of microphones to the target audio source can be expressed as:

$$\tilde{h} = P_n P\{P_n^{-1} p_x\} = P_n f_{GEV}$$

Thus, it is shown that the GEV solution can be used to estimate the steering vector h. The estimated vector h may then be plugged into the minimum variance distortionless response (MVDR) solution to enforce the distortionless constraint and project the output to the first channel by the following expression:

$$h = \frac{\tilde{h}}{\tilde{h}(1)}$$

The first channel here was chosen arbitrarily, and we may choose to project onto any desired channel instead.

Accordingly, the GEV may be used to estimate the relative transfer function (RTF) using the principal eigenvalue method, which may then be plugged in the MVDR solution as follows:

$$f_{MVDR} = \frac{P_n^{-1} h}{h^H P_n^{-1} h}$$

$$f_{MVDR} = \frac{\tilde{h}(1) f_{GEV}}{f_{GEV}^H \tilde{h}}$$

Thus, the target audio (e.g., speech) output can be expressed as: $\hat{y} = f_{MVDR}^H x$. The noise output can be expressed as: $\hat{n} = z[1] - \hat{y}$ (in the case where the first channel is picked as the reference channel).

It is noted that, from the Matrix Inversion Lemma, the following equation $\tilde{h} = P_n f_{GEV}$ can be replaced as follows: $\tilde{h} = P_x f_{GEV}$. It has been contemplated that the replacement of the covariance matrix $P_n$ with the covariance matrix $P_x$ in the above equations should not have a significant impact on the resulting MVDR beamformer. In practice, there may be an impact on the solution in that the step sizes for tracking $P_n$ and $P_x$ may not be identical, however this impact is minimal in the present embodiment. The advantage of using the foregoing process includes reducing memory consumption in the audio processing device as information related to the matrix $P_n$ is no longer needed (and no longer needed to be stored in the memory of the device).

Alternatively, in a blind analytical normalization process of the present disclosure, the target audio signal may be expressed as:

$$\hat{y} = \sqrt{\frac{\tilde{h}^H \tilde{h}}{M}} \frac{f_{GEV}^H x}{f_{GEV}^H \tilde{h}}$$

and the noise audio output may be expressed as:

$$\hat{n} = z[1] - \tilde{h}(1) \frac{f_{GEV}^H x}{f_{GEV}^H \tilde{h}}$$

(the above equation is written in the case that the first channel is the reference).

Normalized Matrix Inverse Tracking

In a conventional closed-form, non-iterative GEV, the matrix $P_n$ is inverted at every step, which is computationally expensive. As such, a tracking method in accordance with one or more embodiments does not require inverting the matrix $P_n$ at every step. To illustrate how the tracking method works, we propose a method based on the Sherman-Morrison Formula as follows. Given a matrix $P_0$, arbitrary numbers $\alpha$, $\lambda$, and a vector x, then if $Q_0 = \lambda P_0^{-1}$ and $P_1 = \alpha P_0 + (1-\alpha)xx^H$, then:

$$Q_1 = \frac{Q_0}{\alpha}\left[I - \frac{(1-\alpha)xx^H Q_0}{\alpha\lambda + (1-\alpha)x^H Q_0 x}\right] = \lambda P_1^{-1}$$

This technique can be adapted to allow frame-by-frame tracking of the inverse of $P_n$ without requiring performance of costly matrix inversions. By choosing $\lambda$, normalization can also be performed simultaneously, because when x is very small, the inverse matrix would include large numbers, which can increase computational cost. Furthermore, normalizing the values in the inverse of the matrix $P_n$ has no substantial adverse effect on the GEV vector since the latter is subsequently normalized itself. It is noted that the value of $\lambda$ can be any form of normalization factor that will numerically stabilize the values of Q.

Principal Eigenvector Tracking

The approaches described in the foregoing sections address the complexity involved in GEV normalization and matrix inversion. However, it is noted that extracting the principal eigenvector from an N×N matrix at each iteration is also computationally expensive. As such, in accordance with various embodiments of the present disclosure, one iteration of the power method is provided to track the principal eigenvector with the assumption of a continuous evolution for the principal eigenvector. Given an initial estimate for the dominant eigenvector $f_{GEV}$ and the matrix $C = Q_n P_x$, the iteration can be expressed as:

$$f_{GEV} = \frac{C f_{GEV}}{\max|C f_{GEV}|}$$

Repeating the above operation allows the GEV vector to converge to the true principal eigenvector. However, it is noted that in practical operation one iteration is often sufficient to result in rapid convergence and effectively track the true eigenvector, thereby supporting an assumption of spatial continuity.

Robustness to Blind Initialization

One of the issues with the above described process is that if the initialization of $P_x$ or $P_n$ takes either value far from their real values and the adaptation step sizes are relatively small, it is possible that the equation $P_x = P_S hh^H + P_n$ may be invalid for a period of time, thereby creating a filter that does not have reflect the audio environment physical sense and an output that does not accomplish the intended goal of enhancing the target audio signal. One way to ensure that this does not happen is to compare one or more measures of the two matrices (for example, one element between the two matrices). If the comparison indicates that the above equation is violated, it is contemplated that the matrix $P_x$ may be replaced with the matrix $P_n$ or vice-versa (which may include storing the matrix $P_n$ or approximating $P_n$ from $Q_n$), or temporarily change the smoothing factor of either adaptation. In one embodiment, since $P_S$ is a positive number, it implies that $\text{norm}(P_x) \geq \text{norm}(P_n)$.

Another observation is that this issue manifests itself when the updates of $P_x$ or $P_n$ are negligible (e.g., the current $P_x$ is at 1 and the calculated update is $10^{-9}$). This suggests also accelerating the smoothing factor to ensure a non-negligible update rate.

Algorithm

As illustrated by the discussion above, and in accordance with various embodiments of the disclosure, audio signals may be efficiently processed to generate an enhanced audio output signal using the modified GEV technique as disclosed herein, with or without the knowledge of the geometry of the microphone array. Referring back to FIG. 4A, the target enhancement engine 400 may receive a number of sub-band frames for each audio channel (e.g., each audio signal generated by a microphone from the microphone array). The audio enhancement circuitry 400 includes the target audio source RTF estimator 410 and the audio signal enhancer 415. The target audio enhancer 400 may receive sub-band frames, for example, from the sub-band decomposition circuitry 320. Before processing the sub-band frames, the target audio enhancer 400 of some embodiments may initialize multiple variables. For example, the function $f_{GEV}$ and the matrix $P_x$ may be generated and initialized. The variable $\lambda$ may be initialized with a value of 1, and the matrix $Q_n$ to be equal to $P_x^{-1}$. The smoothing constants $\alpha$ and $\beta$ may also be selected. In addition, a normalization factor function $\emptyset$ may be selected. The target audio enhancer 400 (such as through the target audio source RTF estimator 410) may be configured to normalize the matrix $Q_n$ by applying the normalization factor $\emptyset$ to the matrix $Q_n$. The normalization factor can be a function of $Q_n$ such as $\emptyset\{Q_n\} = \text{real}(\text{trace}\{Q_n\})$.

As discussed above, the audio enhancement circuitry 400 may receive an activity signal indicating the presence or absence of the target audio from the activity detector 405. In some embodiments, the activity detector 405 may be implemented as the activity detector 325 in the digital signal processing circuitry 300. According to various embodiments of the disclosure, the target audio source RTF estimator 410 may be configured to update the matrices $P_x$ and $Q_n$ based on the activity signal received from the activity detector 405. In some embodiments, when the received activity signal indicates a presence of the target audio, the target audio source RTF estimator 410 may be configured to update the target audio matrix $P_x$ based on the sub-band frames using the following equation:

$$P_x = \alpha P_x + (1-\alpha)xx^H$$

On the other hand, when the received activity signal indicates an absence of the target audio, the target audio source RTF estimator 410 may be configured to update the inverted noise matrix $Q_n$ using the following equations:

$$Q_n = \frac{Q_n}{\beta}\left[I_M - \frac{(1-\beta)xx^H Q_n}{\beta\lambda + (1-\beta)x^H Q_n x}\right]$$

$$\lambda = \lambda/\emptyset\{Q_n\}$$

$$Q_n = Q_n/\emptyset\{Q_n\}$$

It is noted that the matrix $Q_n$ is the inverse of the noise covariance matrix $P_n$. As shown with the above equations, the target audio source RTF estimator 410 may be configured to update directly the matrix $Q_n$. As such, using these equations, in various embodiments there is no need for the target audio source RTF estimator 410 to perform inversion of the matrix $P_n$ for every update, which substantially reduces the computational complexity of this process.

If it is determined that the initial values in $P_x$ or $P_n$ deviate from the actual audio signal too much, the target audio source RTF estimator 410 may be configured to adjust $P_x$ and/or $P_n$ to satisfy the model $P_x = P_s hh^H + P_n$, as discussed above.

Thereafter, the target audio source RTF estimator 410 may be configured to use the updated matrices $P_x$ and $Q_n$ in the modified GEV solution to calculate the steering vector h to be used by the audio signal enhancer 415 or beamformer 470 of FIG. 4B (e.g., an MVDR beamformer) as follows:

$$C = Q_n P_x$$

$$f_{GEV} = \frac{Cf_{GEV}}{\max|Cf_{GEV}|}$$

$$h = P_x f_{GEV}$$

It is noted that the steering vector h correlates to a location of the target audio source. In other words, by computing the steering vector h using the techniques discussed above, the target audio source RTF estimator 410 might also be used to estimates the location of the target audio source relative to the array of microphones, in the case that the array geometry is known. Also, as discussed above, the vector h may be normalized to generate $\bar{h}[1]$. In some embodiments, the target audio source RTF estimator 410 may pass the computed steering vector h or the normalized steering vector $\bar{h}[1]$ to the audio signals enhancer 415. Then, the audio signals enhancer 415 may be configured, in various embodiments, to process the MVDR beamforming solution as follows:

$$f_{MVDR} = \frac{\bar{h}[1]f_{GEV}}{(f_{GEV}^H h)}$$

The audio signal enhancer 415 may then be configured to compute the target audio output $\hat{y}$ as:

$$\hat{y} = f_{MVDR}^H x$$

and compute the noise output $\hat{n}$ as:

$$\hat{n} = x[1] - \hat{y}$$

The target audio output and/or the noise output may then be used by the audio signals enhancer 415 to generate a filter, which may be applied to the audio input signals to generate an enhanced audio output signal for output. In some embodiments, using the techniques disclosed herein, the audio signal is processed to generate the enhanced audio output signal by enhancing the portion of the audio input signals corresponding to the target audio and suppressing the portion of the audio input signals.

Figure 5:
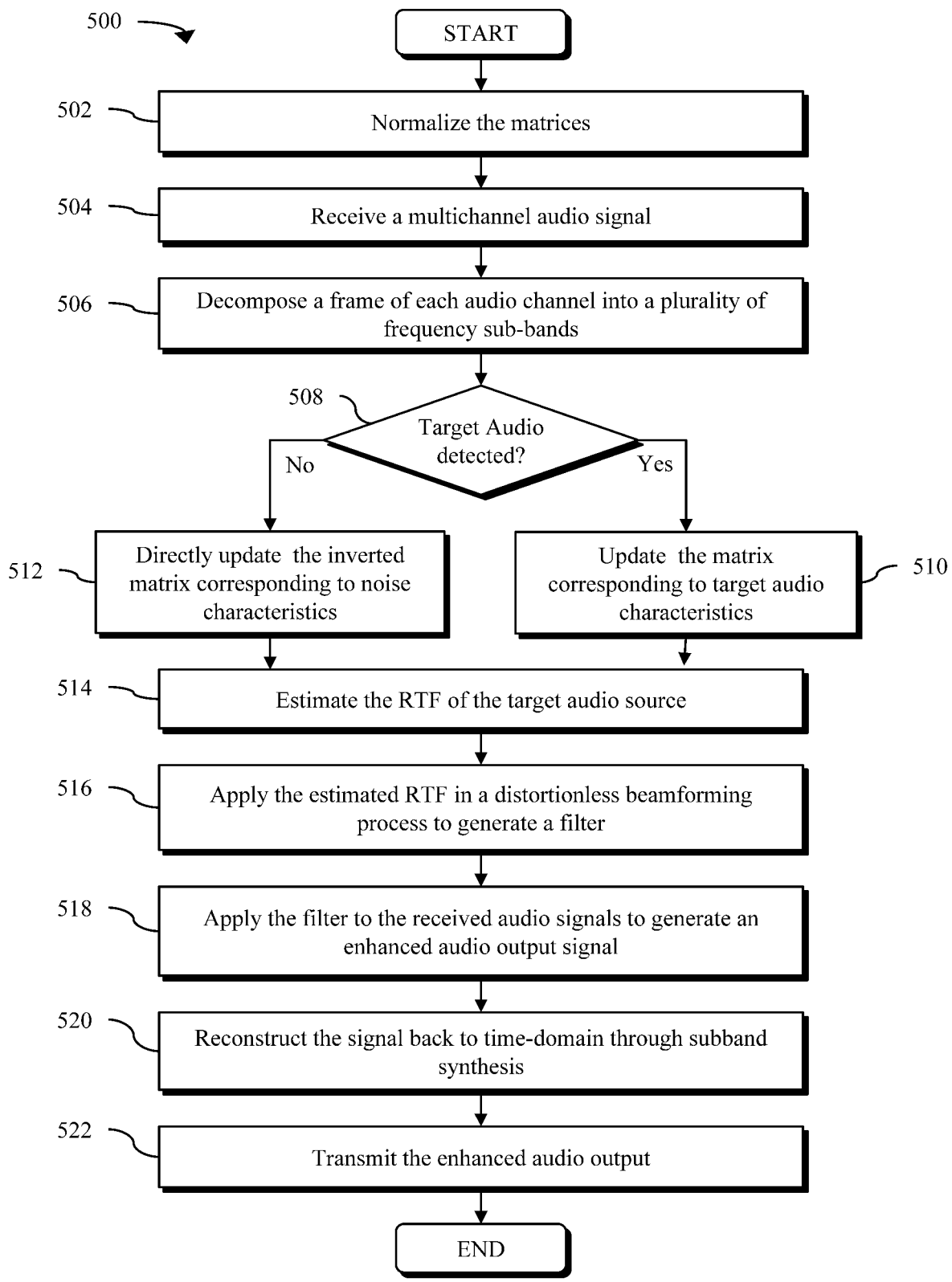
FIG. 5 illustrates an exemplary process for performing a real-time audio signal processing in accordance with one or more embodiments of the disclosure.

FIG. 5 illustrates an exemplary method 500 for processing audio signals in real-time using the modified GEV techniques according to various embodiments of the disclosure. In some embodiments, the process 500 may be performed by one or more components in the audio signal processor 300. As discussed above by reference to FIG. 4, multiple variables may be initialized before processing the audio signals. The process 500 then begins by normalizing (at step 502) the matrix $Q_n$, which is an inversion of the noise distribution matrix $P_n$. In some embodiments, the matrix $Q_n$ may be normalized by applying a normalization factor function Ø to the matrix $Q_n$, such as $\emptyset\{Q_n\} = \text{real}(\text{trace}\{Q_n\})$.

The process 500 then receives (at step 504) a multichannel audio signal. In some embodiments, the multichannel audio signal includes audio signals received from an array of microphones (e.g., microphones 305a-305n) via the corresponding channels. Upon receiving the multichannel audio signal, the process 500 decomposes (at step 506) each channel of the multichannel audio signals into sub-band frames in the frequency domain according to a set of predetermined sub-band frequency ranges.

Thereafter, the process 500 analyzes the sub-band frames to determine (at step 508) whether the target audio is present in the sub-band frames. In some embodiments, the determining of whether the target audio is present in the sub-band frames may be performed by a target activity detector, such as the target activity detector 325. For example, when the target audio includes human speech, the activity detector may include a voice activity detector that is configured to detect whether human voice is present in the sub-band frames.

If it is determined that the target audio is present in the sub-band frames, the process 500 updates (at step 510) the matrix corresponding to the target audio characteristics based on the sub-band frames. For example, the target audio source RTF estimator 410 may update the matrix $P_x$ using $P_x = \alpha P_x + (1-\alpha)xx^H$. On the other hand, if it is determined that the target audio is not present in the sub-band frames, the process 500 updates (at step 512) the matrix corresponding to the noise characteristics based on the sub-band frames. For example, the target audio source RTF estimator 410 may update the matrix $Q_n$ using the following equations, as discussed above:

$$Q_n = \frac{Q_n}{\beta}\left[I_M - \frac{(1-\beta)xx^H Q_n}{\beta\lambda + (1-\beta)x^H Q_n x}\right]$$

$$\lambda = \lambda/\emptyset\{Q_n\}$$

$$Q_n = Q_n/\emptyset\{Q_n\}$$

Also as discussed above with respect to various embodiments, the matrix $Q_n$ is the inverse of the noise covariance matrix $P_n$ and the target audio source RTF estimator 410 of some embodiments may update the inverted matrix $Q_n$ directly without performing a matrix inversion in this step. Additionally, these equations enable the target audio source RTF estimator 410 to take into account the normalization factor during the updating. In some embodiments, the process 500 may iterate steps 508 through 512 as many times as desired by obtaining new sub-band frames from the sub-band decomposition circuitry 320, and update either one of the matrices $P_x$ and $Q_n$ at each iteration depending on whether the target audio is detected in the newly obtained sub-band frames.

Once the matrices are updated, the process 500 estimates (at step 514) the RTF of the target audio source (e.g., the target audio source 110) relative to the locations of the array of microphones based on the updated matrices. In some embodiments, estimating the RTF of the target audio source comprises computing a steering vector from the array of microphones to the target audio source. For example, the target audio source RTF estimator 410 may compute the vector using the following equations, as discussed above:

$$C = Q_n P_x$$
$$f_{GEV} = \frac{Cf_{GEV}}{\max|Cf_{GEV}|}$$
$$h = P_x f_{GEV}$$

The process 500 then applies (at step 516) the estimated RTF in a distortionless beamforming solution to generate a filter. For example, the audio signals enhancer 415 may use the computed vector in an MVDR beamforming solution based on the following equation:

$$f_{MVDR} = \frac{\overline{h[1]} f_{GEV}}{(f_{GEV}^H h)}$$

Based on the MVDR beamforming solution, the audio signals enhancer 415 may then compute a target audio output that includes data related to the target audio from the sub-band frames using $\hat{y} = f_{MVDR}^H x$. In addition, the audio signal enhancer 415 may also compute a noise output that includes data related to noise from the sub-band frames using $\hat{n} = x[1] - \hat{y}$. The audio signal enhancer 415 may generate a filter based on at least one of the target audio output or the noise output. For example, the filter may include data from the noise output, and when applied to the audio signals suppress or filter out any audio data related to the noise thereby leaving the audio signals with substantially the target audio. In another example, the filter may include data from the target audio output, and when applied to the audio signals, enhance any audio data related to the target audio.

At step 518, the process 500 applies the generated filter to the audio signals to generate an enhanced audio output signal. The enhanced audio output signal may then be transmitted (at step 520) to various devices or components. For example, the enhanced audio output signals may be packetized and transmitted over a network to another audio output device (e.g., a smart phone, a computer, etc.). The enhanced audio output signals may also be transmitted to a voice processing circuitry such as an automated speech recognition component for further processing.

The foregoing disclosure is not intended to limit the present invention to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize advantages over conventional approaches and that changes may be made in form and detail without departing from the scope of the present disclosure. Thus, the present disclosure is limited only by the claims.

What is claimed is:

1. A method for processing audio signals, comprising:
receiving a multichannel audio signal based on audio inputs detected by a plurality of audio input components;
determining whether the multichannel audio signal comprises target audio associated with an audio source;
directly estimating in real time, a scaled inverse of a noise covariance matrix, without first estimating the covariance matrix, in response to the determining that the multichannel audio signal does not comprise the target audio;
estimating a relative transfer function of the audio source with respect to the plurality of audio input components based on the multichannel audio signal and the estimated scaled inverse of the noise covariance matrix; and
processing the multichannel audio signal to generate an audio output signal by enhancing the target audio in the multichannel audio signal based on the estimated relative transfer function.

2. The method of claim 1, further comprising transforming the multichannel audio signal to sub-band frames according to a plurality of frequency sub-bands, wherein the estimating the relative transfer function of the audio source is further based on the sub-band frames.

3. The method of claim 1, further comprising estimating in real time, a maximum eigenvector of a product of the scaled inverse covariance matrix and a target audio covariance matrix, by using a power method, wherein the estimating the relative transfer function comprises computing a vector.

4. The method of claim 1,
wherein the estimating the scaled inverse of the noise covariance matrix comprises using a Sherman-Morrison formula to directly update the scaled inverse noise covariance matrix based on the audio signal in response to a determination that the multichannel audio signal does not comprise the target audio.

5. The method of claim 1, further comprising generating a target audio power covariance matrix representing characteristics of the target audio in the audio inputs, and updating the target audio covariance matrix based on the multichannel audio signal in response to a determination that the multichannel audio signal comprises the target audio.

6. The method of claim 3, wherein the computed vector is an eigenvector.

7. The method of claim 3, wherein the computing the vector comprises using an iterative extraction algorithm to compute the vector.

8. The method of claim 1, wherein the plurality of audio input components comprises an array of microphones.

9. The method of claim 8, further comprising outputting the audio output signal.

10. The method of claim 9, wherein the audio output signal is output to an external device over a network.

11. The method of claim 8, further comprising:
determining a command based on the audio output signal; and
transmitting the command to an external device.

12. The method of claim 11, further comprising:
receiving data from the external device based on the transmitted command; and in response to receiving the data from the external device, providing an output via one or more speakers based on the received data.

13. An audio processing device comprising:
a plurality of microphones configured to detect audio inputs and generate a multichannel audio signal based on the detected audio inputs;
an audio activity detector configured to determine whether the multichannel audio signal comprises target audio associated with an audio source;
a target audio source relative transfer function estimator configured to:
directly estimate in real time, a scaled inverse of a noise covariance matrix without first estimating the covariance matrix in response to the determination that the multichannel audio signal does not comprise the target audio source; and
estimate the relative transfer function of the audio source with respect to the plurality of audio input components based on the multichannel audio signal and the estimated scaled inverse of the noise covariance matrix; and
an audio signal processor configured to process the multichannel audio signal to generate an audio output signal by enhancing the target audio signal in the multichannel audio signal based on the estimated relative transfer function.

14. The audio processing device of claim 13, further comprising:
a sub-band decomposer configured to transform the multichannel audio signal to sub-band frames according to a plurality of frequency sub-bands,
wherein the target audio source relative transfer function estimator is configured to estimate the relative transfer function of the audio source based further on the sub-band frames.

15. The audio processing device of claim 13, wherein the target audio source relative transfer function estimator is configured to:
estimate in real time, a maximum eigenvector of a product of the scaled inverse covariance matrix and a target audio covariance matrix, by using a power method; and
estimate the relative transfer function of the audio source by computing a vector.

16. The audio processing device of claim 13, wherein the estimate of the scaled inverse of the noise covariance matrix comprises using a Sherman-Morrison formula to directly update the scaled inverse noise covariance matrix based on the multichannel audio signal.

17. The audio processing device of claim 15, wherein the vector is computed using an iterative extraction algorithm.

18. The audio processing device of claim 13, wherein the plurality of audio input components comprises an array of microphones.

19. The audio processing device of claim 13, further comprising one or more speakers configured to output the audio output signal.

20. The audio processing device of claim 13, further comprising a network interface configured to transmit the audio output signal to an external device.

21. The audio processing device of claim 13, further comprising a speech recognition engine configured to determine one or more words based on the audio output signal.

22. The audio processing device of claim 21, wherein the speech recognition engine is further configured to map the one or more words to a command.

23. The audio processing device of claim 13, wherein the desired audio signal comprises a voice signal, and wherein the audio activity detector is a voice activity detector.

* * * * *